_United States Patent Office_ 2,925,357
Patented Feb. 16, 1960

2,925,357
SILICONIZED INERT BASE MATERIALS

Charles W. Kothen, Buffalo, N.Y., assignor to Union Carbide Corporation, a corporation of New York No Drawing. Application November 8, 1954
Serial No. 467,640

3 Claims. (Cl. 117—121)

This invention relates to an improved process of coating inert base articles with silicon.

Inert base materials composed of carbon, graphite or refractory metal oxide, because of their high sublimation points, strength and low specific gravity are especially well-suited for use under conditions where extremely high temperatures are encountered. This usefulness, however, is limited in the case of carbon articles to those applications where conditions are non-oxidizing and non-abrasive because of the ease of oxidation and abrasion of this material.

It is known to those skilled in the art that the useful life of such articles can be increased greatly if they are protectively coated with a substance having a high degree of resistance to oxidation and abrasion. Among materials which provide this protection are silicon and silicon carbide.

One present commercial practice, which consists in heating the desired articles at a temperature above 1400° C. in the presence of silicon or siliceous and carbonaceous material until silicon carbide forms on the article, presents several difficulties. For one, silicon carbide coatings, although quite efficient in preventing oxidation, require relatively high reaction temperatures to form, may involve attack on the base material, and often are too porous to satisfy the more stringent requirements of the trade. For another, it may be difficult to polish these coatings to the degree required by precision parts in instruments destined for use in high temperature processes.

Another method of depositing a protective coating on inert base materials is the hydrogen reduction of silicon tetrachloride at about 1150° C. In this case, silicon coatings are deposited. This method suffers from the fact that a large excess of very pure hydrogen is required.

It is, therefore, the general object of this invention to obviate the difficulties of the prior art processes mentioned above.

A primary object of this invention is to provide a method by which inert base materials may be coated rapidly with silicon metal at relatively low temperatures. A further object of this invention is to form such coatings uniformly, and rapidly, without thereby deleteriously affecting the base materials.

The present invention whereby such objects are obtained comprises the formation of a silicon coating by the controlled decomposition of trichlorosilane in a flowing, non-oxidizing carrier atmosphere. Temperatures ranging from 600° C. to 1150° C. are sufficient to effect this decomposition, and to deposit in a short time a silicon coating on the surface of the inert base material which is sufficiently dense to retard or halt the oxidation of the base material up to temperatures of 1550° C.

According to the practice of the invention, the article whose coating is desired is inserted in a suitable controlled atmosphere type furnace, the carrier gas, preferably hydrogen, is saturated with $SiHCl_3$ and passed through the furnace, the exhaust vapors being condensed, collected and eventually recycled. The formation of the silicon which coats the base material occurs as represented in the following equation:

$$4SiHCl_3 \rightarrow 3SiCl_4 + 2H_2 + Si$$

Depending on the temperature at which the reaction takes place and the rate of flow of trichlorosilane, a period of from two to five hours is required to form a minimum desired thickness of 0.0015 inch. In order to ensure a uniform thickness, the base material is rotated periodically within the furnace.

Hydrogen has been used as a carrier gas for the trichlorosilane, but nitrogen or any of the inert gases such as helium and argon may also be saturated with the reacting compound for cycling through the furnace. The purity of the gas which is employed is not critical, it being merely necessary to dry it by passage through the usual desiccants such as anhydrous calcium sulphate or magnesium perchlorate.

As an example of the practice of this invention, a graphite cylinder weighing 41.744 grams was placed in a tube furnace. A temperature of approximately 830° C. was maintained. Hydrogen gas saturated with trichlorosilane was passed through the intake tube of the furnace, the waste gases being allowed to exit through the exhaust tube. The graphite cylinder was turned over manually after each hour. After a three-hour period, the cylinder was examined and found to be completely coated with silicon and weighed 43.133 grams, an increase of 1.389 grams representing an average coat thickness of 0.0044 inch. Microscopic examination indicated a continuous nonporous layer of silicon tightly adherent to the irregular surface of the graphite cylinder. An oxidation test of the above cylinder was conducted in a muffle furnace at 900° C. with air circulated by convection only. After ninety-three hours the final weight of the cylinder showed a gain of 0.03 gram as a result of superficial oxidation. Further, no base carbon had been oxidized away.

As another example, a rocket nozzle made of graphite and weighing 168 grams was placed in a tube furnace. At a temperature of 830° C. hydrogen gas saturated with trichlorosilane was passed through the furnace for two and one-half hours. The nozzle was turned manually twice during that period. Upon examination it was found that the article had gained 1.039 grams in weight, producing a coating of silicon 0.0015 inch thick at the throat. The throat of the nozzle was subjected to the blast of an oxy-acetylene torch under highly oxidizing conditions with the temperature at the inner surface of the nozzle reading approximately 1470° C. at the end of four minutes. The approximate temperature was measured with an optical pyrometer. The throat diameter showed a decrease of 0.0034 inch, which was accounted for by the partial oxidation of the silicon. A graphite nozzle subjected to similar treatment, but without the protective silicon coat, widened at the throat by 0.076 inch.

As an example of the practice of this invention, an aluminum oxide shape weighing 14 grams was placed in a tube furnace for one hour. An average temperature of 830° C. was maintained as the trichlorosilane gas, carried by a hydrogen atmosphere, was passed through the intake tube of the furnace and over the boat, the waste gases being allowed to exit through the exhaust tube. It was found that the aluminum oxide shape had thus been coated with silicon and had gained 0.5 gram in weight.

As another example of this invention, a zirconium dioxide shape weighing 46 grams was placed in the tube furnace and treated as above. A temperature of 830° C. was maintained during this period. Upon completion of the run, a gain in weight due to an evenly distributed silicon coating as shown by microscopic examination was found to amount to 0.5 gram.

The preferred temperature range for the process of the invention lies between 700° and 950° C. Below 700° C. coating deposition rates are slow. However, the reaction will take place at temperatures ranging between 600° and 1150° C. Optimum flow rates of carrier gas saturated with $SiHCl_3$ are about one to five liters per hour for a tube furnace with 1¼ inch internal diameter for cylindrical samples which are ⅞ inch in diameter and 1 inch long, although higher flow rates may be used. The greatest efficiency is in the case of siliconizing the interior of tubes or rocket nozzles, since by channelling the trichlorosilane, there is less loss of silicon on the furnace walls. The flow rate of the stream must be increased proportionately, with an increase in the inside diameter of the furnace.

Among other advantages of the present invention is the fact that it is much easier to produce silicon coatings on inert base materials when pure trichlorosilane is used than when pure silicon tetrachloride is employed. Further, carbon which has been siliconized in the manner described above can resist oxidation in air at 900° C. for over 100 hours and at 1100° C. for over 50 hours, provided the coatings are over 0.0015 inch thick. In addition, the silicon coatings are capable of being highly polished as opposed to silicon carbide coats. This smooth surface is highly adaptable for precision parts such as rocket nozzles. Articles of various shapes and sizes can also be siliconized in this manner.

What is claimed is:

1. An abrasion resistant, oxidation impervious article composed of a base material, inert to silicon at temperatures up to about 1150° C., and a surface coating of substantially pure silicon, said coating being of a thickness of between 0.0015 inch and 0.0044 inch.

2. An abrasion resistant, oxidation impervious article composed of a carbonaceous base, inert to silicon at temperatures up to about 1150° C., and a surface coating of substantially pure silicon, said coating being of a thickness of between 0.0015 inch and 0.0044 inch.

3. An abrasion resistant, oxidation impervious article composed of a refractory metal oxide, inert to silicon at temperatures up to about 1150° C., and a surface coating of substantially pure silicon, said coating being of a thickness of between 0.0015 inch and 0.0044 inch.

References Cited in the file of this patent

UNITED STATES PATENTS

| | | |
|---|---|---|
| 278,415 | Edison | May 29, 1883 |
| 2,501,051 | Henderson | Mar. 21, 1950 |
| 2,614,947 | Heyroth | Oct. 21, 1952 |
| 2,665,998 | Campbell | Jan. 12, 1954 |
| 2,689,166 | Rust et al. | Sept. 14, 1954 |
| 2,689,807 | Kempe et al. | Sept. 21, 1954 |
| 2,711,973 | Wainer et al. | June 28, 1955 |